3,335,182
ALKYLIMINODITHIOCARBONATES AND
ALKALI SALTS THEREOF
Ralston Curtis, Los Altos, Calif., and George E. Lukes, deceased, late of El Cerrito, Calif., by John Hazzard, administrator, Kentfield, Calif., assignors to Stauffer Chemical Company, New York, N.Y., a corporation of Delaware
No Drawing. Filed May 17, 1965, Ser. No. 456,568
6 Claims. (Cl. 260—566)

This invention relates to the control of certain undesirable organisms. More particularly, this invention pertains to certain new and novel compounds, N-substituted S,S-dialkali metal imino dithiocarbonates, as represented by the following formula:

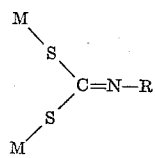

wherein M is an alkali metal and R is a lower alkyl group, and to the utility of said compounds in pesticidal compositions.

By lower alkyl is meant such radicals containing from one to four carbon atoms.

The compounds of the present invention may be conveniently prepared by reacting the appropriate primary amine and carbon disulfide in the presence of an alkali metal hydroxide or mixed alkali metal hydroxides. The reaction may be represented by the folowing equation:

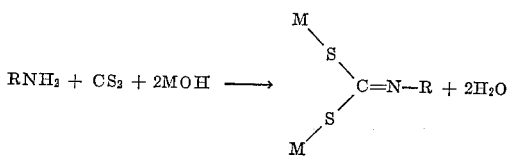

The following examples illustrate in greater detail the process for obtaining the compounds of the present invention.

EXAMPLE 1

*Disodium methyliminodithiocarbonate.*—Methyl amine (37.5 g., 0.5 mole) in 40 percent solution in water and carbon disulfide (38.0 g., 0.5 mole) were mixed together slowly at 0–5° C. There was added to this mixture at 0–5° C. a 50 percent by weight aqueous solution of hydroxide (80.0 g., 1.0 mole). After the addition was completed the reaction mixture was allowed to warm up to 25° C. and was stirred for one hour at this temperature. The solution was then cooled to 10° C. and crystal separation took place. The crystals were filtered and dried. There was obtained a 74 percent yield of the title compound.

EXAMPLE 2

*Dipotassium n - propyliminodithiocarbonate.*—In a similar manner as described in Example 1, n-propyl amine (11.8 g., 0.2 mole) was reacted with carbon disulfide (15.2 g., 0.2 mole) in the presence of a 50 percent by weight water solution of potassium hydroxide (26.0 g., 0.4 mole). When the reaction was completed the mixture was diluted with water so that a 40% solution by weight of the title compound was obtained.

EXAMPLE 3

*Sodium potassium methyliminodithiocarbonate.*—In a similar manner as described in Example 1, methyl amine (37.5 g., 0.5 mole) in a 40 percent aqueous solution was reacted with carbon disulfide (38 g., 0.5 mole) in the presence of sodium hydroxide (20 g., 0.5 mole) and potassium hydroxide (32 g., 0.5 mole), both present as aqueous solutions 50 percent by weight. Upon evaporation of the solution in vacuo there was obtained 35 g. of a white solid, M.P. 84–85° C.

*Analysis.*— Calc. for $C_2H_3KNNaS_2$: C, 14.4%; S, 38.3%. Found: C, 15.2%; S, 38.7%.

As previously mentioned, the herein described compositions produced in the above described manner are microbiologically active compounds which are useful and valuable in controlling various bacteria and fungi. The compounds were tested as will be described hereinafter to show their fungicidal and bactericidal efficacy.

*In vitro vial test.*—This test measures the microbiostatic properties of a chemical when in contact with a growing fungus or bacterium in an artificial medium. Two 1-ounce vials were partially filled with malt broth. The compound to be tested was placed in the vials at any desired concentration (expressed in parts per million) and mixed with the broth. The vials were inoculated with water suspensions of spores of *Aspergillus niger* and penicillium sp. The bottles were then sealed and held for one week, after which time the growth of the organisms was observed and noted. The test was repeated using lower concentrations of the compounds being tested to determine the lowest concentration that can be used and still offer some control of the growth of the organism.

The following table shows the results of the in vitro test on some of the compounds of the present invention. Compound numbers have been assigned to each compound and are used throughout the balance of the application.

| Compound Number | M | R | Concentration for control in p.p.m. In Vitro Test | |
|---|---|---|---|---|
| | | | *Aspergillus n.* | Penicillium sp. |
| 1 [a] | Na | $CH_3$ | [b] 5 | [b] 5 |
| 2 | Na | $C_2H_5$ | 10 | [c] 10 |
| 3 | Na | $n-C_3H_7$ | 10 | [c] 10 |
| 4 | Na | $i-C_3H_7$ | [c] 25 | [c] 25 |
| 5 | Na | $n-C_4H_9$ | [b] 5 | 50 |
| 6 | K | $CH_3$ | [b] 5 | [c] 5 |
| 7 [a] | K | $n-C_3H_7$ | 50 | [c] 50 |
| 8 | K | $n-C_4H_9$ | 50 | [c] 50 |
| 9 [a] | Na, K | $CH_3$ | [b] 5 | [c] 5 |
| 10 | Na, K | $C_2H_5$ | 50 | 50 |
| 11 | Na, K | $n-C_4H_9$ | 50 | 50 |

[a] Compound No. 1 prepared in Example 1.
Compound No. 7 prepared in Example 2.
Compound No. 9 prepared in Example 3.
[b] Lowest concentration tested.
[c] Partial control at noted p.p.m.

Compound number 1 was also tested against certain soil-borne pathogenic fungi in a soil fungicide incorporation test. The compound was found to give partial control as low as 10 p.p.m. when tested against *Rhizoctonia solani* and *Fusarium solani* and control at 50 p.p.m. on *Pythium ultimum*.

Compound number 4 when tested against foliage fungi, especially tomato blight, showed 50–75 percent control of the infection at 1000 p.p.m. One thousand parts per million is approximately half the commonly recommended field rate for commercial application. Compounds 1, 2, 6 and 9 showed 25–50% control of tomato blight at a similar concentration. Compound number 1, disodium methyliminodithiocarbonate, was also found particularly effective against root-knot nematodes at a concentration of 10 p.p.m.

The componds of the present invention have been tested as herbicides and found very effective as general herbicidal agents. Compounds 1, 2, 6 and 9 gave particlarly effective control by complete germination inhibition and growth retardation of cucumbers, radishes and red oats at rates of 20 and 100 lbs./acre.

The compounds of the present invention may be used as effective microbiostats and herbicides and may be applied in a variety of ways at various concentrations. In practice the compounds are usually formulated with an inert pesticidal adjuvant utilizing methods well-known to those skilled in the art, thereby making them suitable for applications as dusts, sprays, drenches and the like. The amount applied will depend upon the nature of the particular utility desired. The rate of application may also vary with the pesticidal use intended. If conditions exist that are extremely favorable, for example, to attack of the plant by fungus or bacteria, it may be necessary to repeat the application at very short intervals to prevent infection or to check infection after it has occurred. As an herbicide the amount applied will depend on the nature of the seeds or plants to be controlled and the rate of application may vary from 1 to 200 pounds per acre. One particularly advantageous way of applying the pesticidal composition comprising the adjuvant and an effective amount of a compound of the present invention is in a liquid diluted spray.

Various changes and modifications may be made without departing from the spirit and scope of the invention described herein as will be apparent to those skilled in the art to which it pertains. It is accordingly intended that the present invention shall only be limited by the scope of the appended claims.

We claim:
1. A compound having the formula

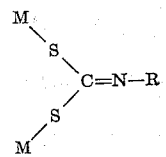

wherein M is an alkali metal selected from the group consisting of sodium, potassium and the combination thereof and R is a lower alkyl group containing up to for carbon atoms.

2. The compound, disodium methyliminodithiocarbonate.

3. The compound, disodium n - propyliminodithiocarbonate.

4. The compound, dipotassium methyliminodithiocarbonate.

5. The compound, sodium potassium methyliminodithiocarbonate.

6. The compound, sodium potassium n-butyliminodithiocarbonate.

References Cited

UNITED STATES PATENTS

| | | | |
|---|---|---|---|
| 2,700,682 | 1/1955 | Blomberg et al. | 260—566 |
| 2,914,560 | 11/1959 | Robertson | 260—566 |
| 2,940,894 | 6/1960 | Craig et al. | 167—22 |
| 2,953,563 | 9/1960 | Schaefer et al. | 260—248 |
| 3,004,887 | 10/1961 | Darlington et al. | 167—22 |

CHARLES B. PARKER, *Primary Examiner.*
JULIAN S. LEVITT, *Examiner.*
S. J. FRIEDMAN, R. V. HINES, *Assistant Examiners.*

UNITED STATES PATENT OFFICE
CERTIFICATE OF CORRECTION

Patent No. 3,335,182                                      August 8, 1967

Ralston Curtis et al.

It is hereby certified that error appears in the above numbered patent requiring correction and that the said Letters Patent should read as corrected below.

Column 1, line 50, before "hydroxide" insert -- sodium --; column 4, line 13, for "for" read -- four --.

Signed and sealed this 26th day of November 1968.

(SEAL)
Attest:

Edward M. Fletcher, Jr.                              EDWARD J. BRENNER

Attesting Officer                                              Commissioner of Patents